(12) United States Patent
Kolganov et al.

(10) Patent No.: US 10,818,399 B2
(45) Date of Patent: Oct. 27, 2020

(54) THERMONUCLEAR REACTOR

(71) Applicant: STATE ATOMIC ENERGY CORPORATION "ROSATOM" ON BEHALF OF THE RUSSIAN FEDERATION, Moscow (RU)

(72) Inventors: Vladimir Yuryevich Kolganov, Moscow (RU); Ivan Igorevich Poddubnyy, Likino-Dulevo (RU)

(73) Assignee: STATE ATOMIC ENERGY CORPORATION "ROSATOM" ON BEHALF OF THE RUSSIAN FEDERATION, Moscow (RU)

( * ) Notice: Subject to any disclaimer, the term of this patent is extended or adjusted under 35 U.S.C. 154(b) by 0 days.

(21) Appl. No.: 16/348,677

(22) PCT Filed: Oct. 17, 2017

(86) PCT No.: PCT/RU2017/000762
§ 371 (c)(1),
(2) Date: May 9, 2019

(87) PCT Pub. No.: WO2018/093294
PCT Pub. Date: May 24, 2018

(65) Prior Publication Data
US 2019/0272926 A1 Sep. 5, 2019

(30) Foreign Application Priority Data

Nov. 21, 2016 (RU) .................... 2016145575

(51) Int. Cl.
H05H 1/12 (2006.01)
G21B 1/13 (2006.01)
G21B 1/17 (2006.01)

(52) U.S. Cl.
CPC ................ G21B 1/13 (2013.01); G21B 1/17 (2013.01); Y02E 30/128 (2013.01)

(58) Field of Classification Search
CPC .................................... G21B 1/13; G21B 1/17
See application file for complete search history.

(56) References Cited

FOREIGN PATENT DOCUMENTS

| RU | 2212718 C1 | 9/2003 |
|----|------------|--------|
| RU | 118099 U1 | 7/2012 |

(Continued)

OTHER PUBLICATIONS

International Search Report of corresponding International Application No. PCT/RU2017/000762, dated Jan. 25, 2018, 3 pages.

(Continued)

Primary Examiner — Marshall P O'Connor
(74) Attorney, Agent, or Firm — Brooks Kushman P.C.

(57) ABSTRACT

A thermonuclear reactor is provided having a vacuum casing and blanket modules connected thereto with flexible supports. The flexible supports are formed from a material with high electrical conductivity. Each flexible support is secured at one end on the vacuum casing and at the other end on a blanket module, the two secured ends of each flexible support face the blanket module. The flexible support is formed from two hollow cylindrical elements placed one in the other and perforated by longitudinal slots in a part free from mountings. The ends of the hollow cylindrical elements opposite the secured ends are connected electrically and mechanically. The technical result consists in diverting eddy currents away from a blanket module of a thermonuclear reactor and simultaneously eliminating electrical connectors from the composition of a blanket and reducing bunching on a blanket module side facing the vacuum casing.

1 Claim, 1 Drawing Sheet

(56) References Cited

FOREIGN PATENT DOCUMENTS

WO         2012064767 A1     5/2012
WO         2016087726 A1     6/2016

OTHER PUBLICATIONS

Written Opinion of corresponding International Application No. PCT/RU2017/000762 dated Jan. 25, 2018, 7 pages.
International Preliminary Report on Patentability of corresponding International Application No. PCT/RU2017/000762, dated May 21, 2019, 9 pages.
L.M. Giancarli et al., Overview of the ITER TBM Program, Fusion Engineering and Design 87, 2012, pp. 395-402.
Decision to Grant of Russian Application No. 2016145575/07 dated Aug. 31, 2017, 11 pages.
Raffray et al, Overview of the design and R&D of the ITER blanket system, Fusion Engineering and Design, 87, 2012, pp. 769-776.

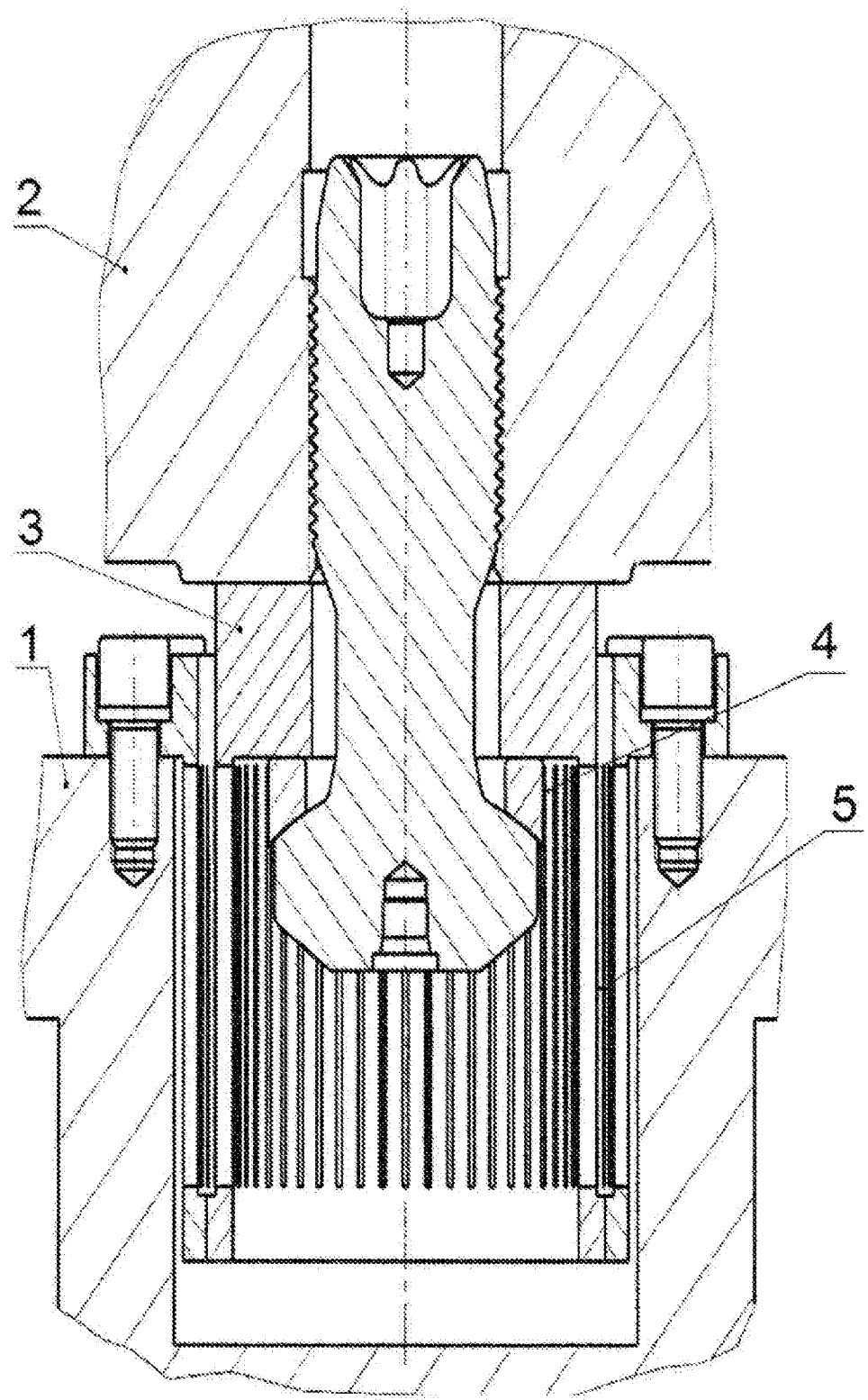

THERMONUCLEAR REACTOR

CROSS REFERENCE TO RELATED APPLICATIONS

This application is the U.S. national phase of PCT Application No. PCT/RU2017/000762 filed on Oct. 17, 2017, which claims priority to Russian Patent Application No. RU 2016145575 filed on Nov. 21, 2016, the disclosures of which are incorporated in their entirety by reference herein.

FIELD OF THE INVENTION

The invention relates to thermonuclear engineering and is used in the production of tokamak thermonuclear power plants.

PRIOR ART

A thermonuclear reactor is known from the prior art, which comprises a vacuum vessel and protective blanket modules connected thereto by means of flexible supports with fasteners and electrical connectors (A. Rene Raffray, Mario Merola. Overview of the design and R&D of the ITER blanket system. Fusion Engineering and Design, 87 (2012), pp. 769-776). The supports with fasteners provide mechanical connection, while the electrical connectors provide electrical connection.

In the known thermonuclear reactor, a support is designed for mounting a blanket module on the vacuum vessel of the thermonuclear reactor, taking up the compressive and tensile components from an external load. An electrical connector is designed for diverting current away from a blanket module to the vacuum vessel of the reactor. To prevent the flow of electric current through the support, an electrically insulating coating is applied on a number of surfaces of several fasteners of the support. The inclusion of the insulating coating in the support requires additional process operations to apply the insulating coating; in addition, the conditions of maintaining integrity and performance capability in a vacuum under varying temperature fields and high impact loads are imposed on the coating, which complicates the design of the support, necessitates compliance with a number of requirements for handling structural elements with insulating coatings at all stages of the life cycle of the product to allow for preservation of the integrity and insulating properties of the coating, and, consequently, reduces the reliability of the support assembly. Besides, said coatings prevent eddy currents from being diverted away from the blanket modules, which eddy currents are induced in the modules when plasma disruptions occur during the operation of the thermonuclear reactor, which is why a special device is required for this purpose: an electrical connector installed between the vacuum vessel of the reactor and the blanket module providing a contact between the connector and the vessel and the blanket module. In addition to the supports, coolant inlet and outlet pipes, insulating cover plates, coolant collectors, and cables and sensors for diagnostic systems are arranged on the side of the protective blanket modules facing the vacuum vessel; in this way, the entire rear portion of the protective module is fully occupied. For next-generation thermonuclear reactor modules, which do not have protective functions alone (with tritium breeding, with afterburning of long-lived actinides, with enrichment of heavy elements, research and material testing modules, etc.), the appropriate remotely serviced channels will be required; however, there is no space left for the connections of these channels if the current module mounting arrangement is preserved.

The disadvantages of the known thermonuclear reactor are as follows: the need to install electrical connectors for diverting eddy currents away from the blanket modules, and the need to introduce structural elements with an insulating coating into the supports.

The need to install electrical connectors reduces the reliability of the reactor due to the increased number of elements incorporated therein, and creates bunching on the module side facing the vacuum vessel.

The need to introduce structural elements with an insulating coating into the supports reduces the reliability of the reactor, because the number of structural elements in the support assemblies is increased, and the design of some of these elements should have an insulating coating with special design and handling requirements. This disadvantage also increases the degree of bunching in the module mounting area, because the design of the support assemblies, which include structural elements with insulating coatings, takes up more space and complicates the design of the modules whose spaces accommodate parts with insulating coatings, because surfaces with insulating coatings should only be linear (plane, cylinder, cone) to permit finishing of the coating, and they require a special structural design with grooves, chamfers, translational surfaces, etc.

SUMMARY OF THE INVENTION

The objective of the present invention is to provide a thermonuclear reactor with higher reliability.

The technical result of the present invention consists in diverting eddy currents away from the blanket module of a thermonuclear reactor while simultaneously eliminating electrical connectors from the composition of the blanket and reducing bunching on the side of the blanket module facing the vacuum vessel.

The technical result is achieved by the fact that, in a thermonuclear reactor comprising a vacuum case and blanket modules connected thereto by means of flexible supports, wherein each flexible support is secured at one end on the vacuum vessel and at the other end on the blanket module, according to the invention, the flexible supports further carry out the functions of electrical connectors, wherein the supports are made of a material with high electrical conductivity, while the two secured ends of each flexible support face the blanket module, the flexible support itself is formed from two hollow cylindrical elements placed one in the other and perforated by longitudinal slots in a part free from mountings, and the ends of the hollow cylindrical elements opposite the secured ends are connected electrically and mechanically.

The arrangement of said elements of a thermonuclear reactor in this manner eliminates the use of an insulating coating in the design of the supports, while forming a support from a material with high electrical conductivity allows eddy currents to be diverted away from the blanket module of the thermonuclear reactor without the use of additional equipment (electrical connectors), and also reduces the release of energy in the support and, accordingly, the temperature of the support, which factors in conjunction simplify the design of the thermonuclear reactor and, as a consequence, increase its reliability. However, when the functions of the electrical connector are transferred to the flexible support, the transverse forces generated when electric current interacts with the reactor's magnetic field also begin to act upon the support. To balance out the transverse forces, the flexible support is configured as two perforated cylindrical elements placed one in the other, which enables a counterflow of electric current through them. This, in turn, balances out the transverse forces acting on the support when electric current interacts with the reactor's magnetic field, because the force resulting from two equal and oppositely directed forces will be zero. Balancing out the transverse forces inside the support reduces stresses in the support, increasing its load capacity and reliability.

DESCRIPTION OF FIGURES

The essence of the invention is illustrated by FIG. 1, which shows the part of a thermonuclear reactor where the vacuum vessel is connected to a blanket module (longitudinal section).

THE BEST EMBODIMENT OF THE INVENTION

The thermonuclear reactor comprises a vacuum vessel 1 and a blanket module 2 connected thereto by means of a flexible support 3. The support 3 is secured at one end on the blanket module 2, forming mechanical and electrical connections. The other end of the flexible support 3 is connected to the vacuum vessel 1 of the thermonuclear reactor. The two secured ends of the flexible support 3 face the blanket module 2, while the flexible support 3 itself is formed from two hollow cylindrical elements placed one in the other and perforated with slots extended in the axial direction in a part free from mountings. The ends of the hollow cylindrical elements opposite to the secured ends are electrically and mechanically connected in one known way or another (for example, soldering, welding, or soldered thread), or else the entire support is made of a solid workpiece. The flexible support 3 is made of a material with high electrical conductivity, such as chrome-zirconium bronze, and further performs the functions of an electrical connector.

INDUSTRIAL APPLICABILITY

The claimed thermonuclear reactor operates as follows.

During the operation of the thermonuclear reactor, electric currents and dynamic loads caused by plasma disruptions act upon the blanket module 2. The module 2 should be reliably secured on the vacuum vessel 1 of the thermonuclear reactor to balance out the compressive and tensile components of external loads. In addition, a reliable electrical contact is required between the module 2 and the reactor vessel 1 to divert eddy currents away from the module 2 to the vacuum vessel 1. The flexible support 3 performs the function of mounting the blanket module 2 on the vacuum vessel 1, while the compressive or tensile component of external loads from the blanket module 2 is transferred via a connection to the flexible support 3, and from the support, via a second connection, to the vacuum vessel 1 in a way known from the prior art. Since the flexible support 3 is made of a material with high electrical conductivity, in addition to transferring the compressive and tensile components of the force, it diverts electric current away from the blanket module 2 to the vacuum vessel 1. Electric current flows from the blanket module 2 into the cylindrical perforated element 4 of the flexible support 3 connected thereto. Electric current then flows from the said perforated element 4 to another perforated element 5 via their connection point. Electric current then flows from the second element 5 to the vacuum vessel 1 via the point where the flexible support is connected. Meanwhile, the electric current flows through the closely spaced perforated elements 4 and 5 in opposite directions, which balances out the transverse forces generated from the interaction between the electric current and the reactor's magnetic field and acting upon the support as a whole, because the force resulting from the two equal and oppositely directed forces will be zero. The compressive and tensile loads are taken up by the perforated elements of the flexible support 3, because the perforation is implemented with slots extended in the direction of action of this load component (in the axial direction). In the direction transverse to the axial direction, the support 3 is yielding (flexible), because, in the part free from mountings, the perforated elements of the support are a set of rods that are capable of bending.

The invention claimed is:

1. A thermonuclear reactor comprising:
a vacuum vessel and blanket modules connected thereto by means of flexible supports, wherein each flexible support is secured at one end on the vacuum vessel and at the other end on the blanket module,
wherein the flexible supports further carry out the functions of electrical connectors, wherein the supports are made of an electrically conductive material, while the two secured ends of each flexible support face the blanket module, the flexible supports are formed from two hollow cylindrical elements placed one in the other and each of the two hollow cylindrical elements are perforated by longitudinal slots in a part free from mountings, and the ends of the hollow cylindrical elements opposite the secured ends are connected electrically and mechanically.

* * * * *